United States Patent
Hassan et al.

(10) Patent No.: US 7,609,659 B2
(45) Date of Patent: Oct. 27, 2009

(54) SYSTEMS AND METHODS FOR FACILITATING COMMUNICATION OVER A PLURALITY OF COMMUNICATION MEDIUMS

(75) Inventors: Ahmed E. Hassan, Waterloo (CA); Denny K. Chiu, Kitchener (CA); J. F. (Sean) Wilson, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1188 days.

(21) Appl. No.: 10/913,879

(22) Filed: Aug. 6, 2004

(65) Prior Publication Data

US 2006/0029003 A1     Feb. 9, 2006

(51) Int. Cl.
*H04L 12/16* (2006.01)
(52) U.S. Cl. .................. 370/259; 370/338; 370/352; 455/412.2; 455/414.1
(58) Field of Classification Search .............. 370/259, 370/338, 352; 455/412.2, 414.1
See application file for complete search history.

(56) References Cited

U.S. PATENT DOCUMENTS

| | | | |
|---|---|---|---|
| 6,137,792 A | * | 10/2000 | Jonas et al. ............... 370/354 |
| 6,954,453 B1 | * | 10/2005 | Schindler et al. ............ 370/352 |
| 2001/0056466 A1 | | 12/2001 | Thompson et al. |
| 2003/0074451 A1 | | 4/2003 | Parker et al. |
| 2003/0088619 A1 | | 5/2003 | Boundy |
| 2004/0076145 A1 | | 4/2004 | Kauhanen et al. |

FOREIGN PATENT DOCUMENTS

EP     1 324 608 A2     7/2003

OTHER PUBLICATIONS

European Search Report Dated Jan. 14, 2005 For European Patent Application 04018725.4-2414 (9 pgs).

* cited by examiner

*Primary Examiner*—Quynh H Nguyen
(74) *Attorney, Agent, or Firm*—Jones Day; Krishna K. Pathiyal; Robert C. Liang (57) ABSTRACT

A processor-implemented method facilitates communication over a plurality of communication mediums by identifying interlocutors in a first communication and searching contact data to determine whether the interlocutors identified have an associated communication capability over a second communication medium. A second communication between the interlocutors determined to have the associated communication capability over the second communication medium may be established.

50 Claims, 7 Drawing Sheets

SYSTEMS AND METHODS FOR FACILITATING COMMUNICATION OVER A PLURALITY OF COMMUNICATION MEDIUMS

This disclosure relates in general to voice and data communication systems, and in particular relates to systems and methods for managing communications over a plurality of communication mediums.

Multiple interlocutors may communicate by e-mail, telephone, or by some other data or voice communication medium. For example, an e-mail may be sent to multiple recipient interlocutors at once, or multiple interlocutors may converse via a conference call. Switching the communication or establishing a parallel communication between the interlocutors over a second communication medium or mode, however, is not readily facilitated. For example, if several interlocutors are communicating via e-mail and decide to continue the communication over a conference call, one or more interlocutors must arrange for a conference call number, send it to each e-mail interlocutor, and then wait for all interlocutors to call into the number.

The systems and methods described herein facilitate the switching of a communication from a first communication medium to another communication medium, or the establishment of a parallel communication over another communication medium, and/or the provisioning of contact data for use in establishing or joining a communication over another communication medium. These and additional capabilities and features are described in the detailed description.

DETAILED DESCRIPTION

Figure 1:
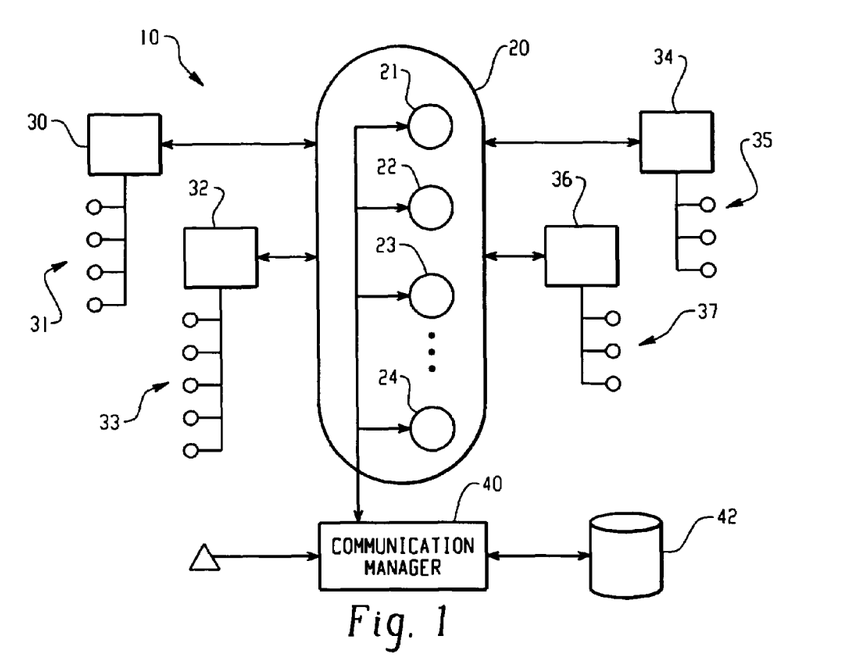
FIG. 1 is a block diagram of a system for facilitating communication over a plurality of communication mediums.

FIG. 1 is a block diagram of a system 10 for facilitating communication 20 over a plurality of communication mediums 21, 22, 23 and 24. Illustrative communication mediums may comprise a work e-mail medium 21, a telephonic medium 22, an SMS messaging medium 23, and a personal e-mail medium 24. Additional voice and/or data mediums or modes may also be included.

The communication 20 comprises a communication in which interlocutors 30, 32, 34 and 36 are participating, and also comprises a particular communication medium. For example, if the communication 20 is a work e-mail communication, then the communication 20 is over a work e-mail medium 21. Likewise, if the communication 20 is a conference call, then the communication 20 is over a telephonic medium 22. Communication mediums may also be of a similar type. For example, communication medium 23 may comprise a personal e-mail medium, which is similar to the work e-mail communication medium 21.

Each interlocutor 30, 32, 34 and 36 has one or more associated communication capabilities 31, 33, 35 and 37, respectively. For example, communication capabilities 31 may include a work e-mail capability for a work e-mail account, a cell phone capability for a mobile communication device, SMS messaging capability for the mobile communication device, and a work phone capability. Communication capabilities 33 may include a work e-mail capability, a personal e-mail capability for a personal e-mail account, a cell phone capability, a work phone capability, and a PIN messaging capability for the mobile communication device (e.g., communications facilitated by a SIM PIN associated with a user of a mobile device or a unique identifier associated with a mobile device). Communication capabilities 35 and 37 may include similar communication capabilities.

A communication manager 40 manages the communication 20 over the plurality of communication mediums 21, 22, 23 and 24. The communication manager 40 may comprise program code including program instructions executable by a processing device, and may be implemented in a system that is operable to monitor or receive data related to one or more communications among the interlocutors 30, 32, 34 and 36. The communication manager 40 is operable to access contact data 42, and to receive an indication to facilitate a second communication over a second communication medium for a first communication over a first communication medium and to identify interlocutors in the first communication in response to the indication.

The communication manager 40 may be implemented in a remote computing device, or in one or more interlocutor communication devices. For example, if the interlocutors 30, 32, 34 and 36 communicate over a plurality of associated mobile communication devices having voice and data communication capabilities, then in one embodiment the communication manager 40 may be implemented in a remote computer device that is operable to monitor and/or manage data transmitted to and from the mobile devices. In another embodiment, the communication manager 40 may be implemented in one or more of the mobile devices and may include program code operable to receive indications from communication managers 40 in other mobile devices to facilitate a second communication over a second communication medium. By way of another example, if the interlocutors 30, 32, 34 and 36 communicate over e-mail via personal computers and converse over the telephone, then in another embodiment the communication manager 40 may be implemented in a server computer that is operable to monitor or manage data transmitted to and from the personal computers and/or telephones.

The contact data 42 comprises communication contact data corresponding to a plurality of communication mediums and interlocutors 30, 32, 34 and 36. In one embodiment, the contact data 42 comprises communication contact data for each communication capability 31, 33, 35 and 37 associated with each interlocutor 30, 32, 34 and 36. Such communication contact data may include phone numbers, e-mail addresses, unique identifier numbers associated with a mobile communication device or users (e.g., a SIM PIN associated with a user of a mobile device or a unique identifier associated with a mobile device), and other communication contact data that may be used to establish a communication over a corresponding communication medium. In one embodiment, the contact data 42 may be stored in a remote computer device that is operable to communicate with the communication manager 40. In another embodiment, contact data 42 may be stored in each mobile device, such as in an address book data store.

A second communication may be facilitated by switching a first communication from a first communication medium to a second communication medium, by establishing a second communication over a second communication medium in parallel with the first communication medium, or by providing communication contact data that a recipient interlocutor may use to join a second communication. For example, if the communication 20 comprises a telephone conference call in which interlocutors 30, 32, 34 and 36 are participating, then the communication manager 40 may establish a second communication by creating an e-mail addressed to each interlocutor 30, 32, 34 and 36.

The communication manager 40 identifies interlocutors in a communication by accessing data related to or within the communication. For example, if the communication comprises an e-mail message, the communication manager 40 may access the address fields of the e-mail to identify the interlocutors. Likewise, if the communication comprises a conference call, the communication manager 40 may access telecommunication call data to identify the interlocutors.

In one embodiment, the communication manager 40 may access the contact data 42 to determine whether the interlocutors identified have an associated communication capability over the second communication medium. Corresponding communication capabilities for the interlocutors 30, 32, 34 and 36 are identified to determine whether the interlocutors 30, 32, 34 and 36 have an associated communication capability over the second communication medium. For those interlocutors that do have an associated communication capability over the second communication medium, the communication manager 40 may establish the second communication between the interlocutors.

In a variation of this embodiment, the communication manager 40 may also send a communication exclusion notification to interlocutors determined not to have an associated communication capability over the second communication medium. The communication exclusion notification may also include contact data for accessing the second communication. For example, if the second communication over the second communication medium comprises a conference call, the communication exclusion notification may include a phone number that the excluded interlocutors may dial to join the conference call.

A communication exclusion notification may also be sent to interlocutors whose corresponding communication contact data is not stored in the contact data 42. For example, a local address book on an interlocutor's mobile communication device may be used as contact data 42. If the interlocutor decides to initiate a teleconference to speak to all recipients of an e-mail message, the local address book will be searched for teleconference communication contact data of each interlocutor, such as a phone number that can be used to place a telephone call to each interlocutor's telephone. A telephone call may not be able to be automatically placed for each interlocutor whose corresponding contact data is not stored in the local address book, however. Accordingly, a communication exclusion notification comprising an e-mail that includes a call-in phone number for the teleconference call may be sent to each excluded interlocutor.

Figure 2:
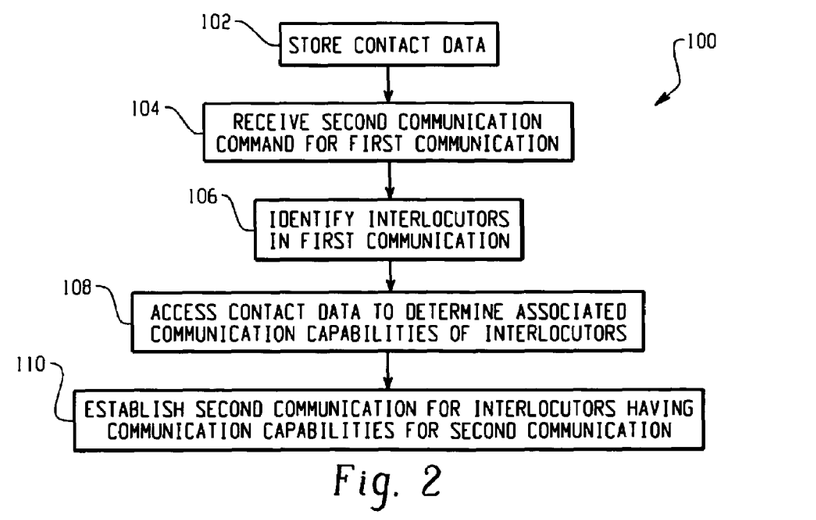
FIG. 2 is a flow diagram for a process of facilitating communication over a plurality of communication mediums.

FIG. 2 is a flow diagram 100 for a process of facilitating communications over a plurality of communication mediums. The process may be processor-implemented in a remote computing device operable to monitor communications among interlocutors, or may be processor-implemented in one or more communication devices associated with the interlocutors. Alternatively, the process steps may be distributed among communication devices associated with the interlocutors and a remote computing device operable to send data to and receive data from the communication devices.

In step 102, contact data comprising communication contact data corresponding to a plurality of interlocutors is stored. This step may be executed prior to any communication among the interlocutors being established, or executed during or after the establishment of a communication among the interlocutors. For example, a company may implement the systems and methods described herein to facilitate communication over a plurality of communication mediums for its employees, or to offer as a service to customers. In both cases, the company may store contact data in a remote computing device, such as in a contact database in a mail server. By way of another example, local address book contact data may be used, and thus the contact data is stored on an interlocutor's communication device.

Alternatively, the contact data may be stored during or after the establishment of a communication among the interlocutors. In this latter embodiment, the contact data may be collected by querying the communication devices associated with each interlocutor, e.g., by sending a contact data request to each mobile communication device associated with each interlocutor, and stored for later access and processing should the interlocutors decide to establish a second communication over a second communication medium.

In step 104, a second communication command for a first communication is received. The first communication comprises an existing communication among interlocutors, such as an e-mail message, a phone conference call, or the like. The second communication command facilitates the establishment of a second communication by switching the first communication from a first communication medium to a second communication medium, or by establishing a second communication over a second communication medium in parallel with the first communication medium. For example, during a conference call, an interlocutor may desire to send an e-mail to all conference call participants so that the document may be discussed during the conference call. A second communication command will thus specify that the interlocutor desires to send an e-mail to all interlocutors on the conference call.

In step 106, interlocutors in the first communication are identified. The interlocutors are identified from communication data associated with the first communication. For example, conference call connection data may be searched to identify interlocutors by their corresponding phone numbers, or an e-mail message may be searched to identify interlocutors by their corresponding e-mail addresses.

In step 108, the contact data is accessed to determine the associated communication capabilities of the interlocutors. Communication contact data identifying the interlocutors obtained in step 106 may be used to search the contact data in step 108. For example, the contact data may be searched by phone number, by e-mail address, by PIN number, or the like.

Thus, contact data from a first communication, such as e-mail addresses in an e-mail, may be used to determine the associated communication capabilities of the interlocutors for a second communication, such as a phone number to place a phone call for a conference call.

In step 110, a second communication for interlocutors having communication capabilities for the second communication is established. Continuing with the conference call example, step 110 may generate an e-mail that is addressed to each interlocutor on the conference call and for which e-mail contact data was obtained. The interlocutor that issued the second communication command may then quickly and conveniently attach the document to the e-mail and send it to all interlocutors participating in the conference call.

Figure 3:
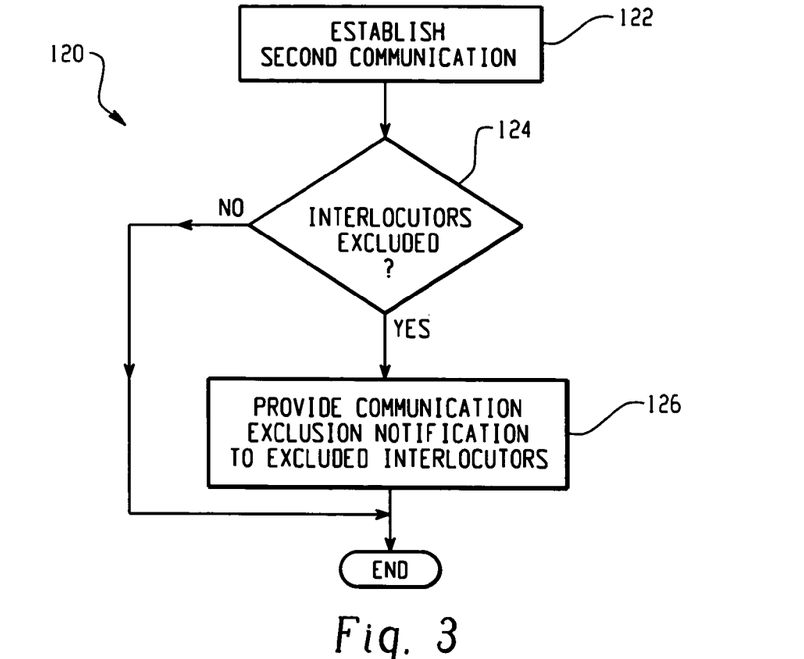
FIG. 3 is a flow diagram for a process of providing a communication exclusion notification.

FIG. 3 is a flow diagram 120 for a process of providing a communication exclusion notification. A communication exclusion notification may be sent to those interlocutors determined not to have an associated communication capability over the second communication medium. The communication exclusion notification may also include communication contact data for accessing the second communication.

Step 122 establishes a second communication for interlocutors having communication capabilities for the second communication. Step 124 determines if interlocutors in the first communication have been excluded from the second communication. An interlocutor may be excluded from a second communication if the contact data corresponding to that interlocutor indicates that the interlocutor does not have a second communication capability, e.g., the interlocutor may not have an e-mail account. An interlocutor may also be excluded from a second communication if there is no communication contact data for the interlocutor stored in the contact data, e.g., if the contact data comprises an address book, an entry for the interlocutor may not be stored in the address book.

If interlocutors are not excluded from the second communication, the process ends. If, however, interlocutors are excluded from the second communication, then step 126 provides a communication exclusion notification to the excluded interlocutors. The communication exclusion notification may be sent to excluded interlocutors over the first communication medium. For example, if the first communication medium is an e-mail medium, the communication exclusion notification may comprise an e-mail addressed to each excluded interlocutor.

The communication exclusion notification may also include communication contact data for accessing the second communication. For example, if the second communication over the second communication medium comprises a conference call, the communication exclusion notification may include a phone number that the excluded interlocutor may dial to join the conference call.

Figure 4:
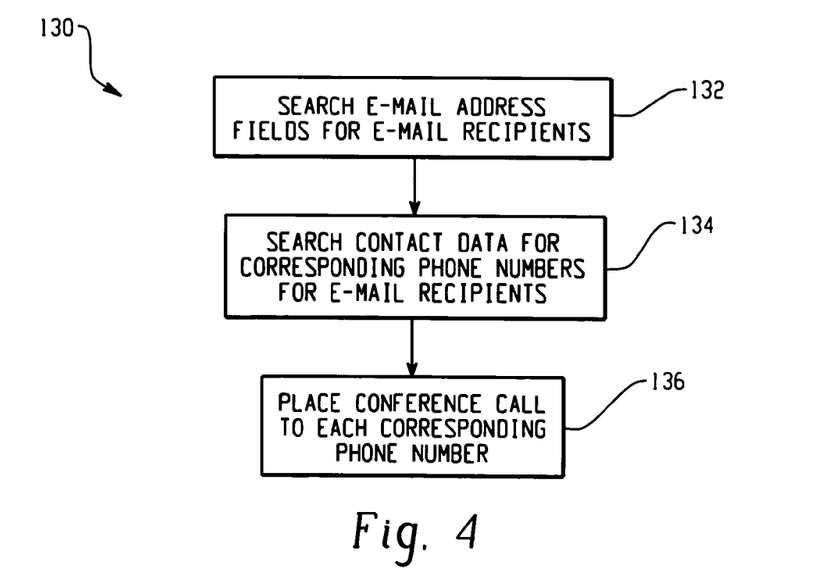
FIG. 4 is a flow diagram for a first process of establishing a second communication.

FIG. 4 is a flow diagram 130 for a first process of establishing a second communication. In the embodiment of FIG. 4, a first communication medium comprises an e-mail medium, and a second communication medium comprises a telephonic medium. The communication contact data associated with the first communication medium comprises an e-mail address, and the communication contact data associated with the second communication medium comprises interlocutor telephone numbers. Step 132 searches an e-mail address field for e-mail recipients to identify the interlocutors. Once the interlocutors are identified, step 134 searches the contact data for corresponding interlocutor phone numbers. A conference call is then placed to each phone number in step 136. Thus, in this example embodiment, each interlocutor would receive a telephone call and would need only answer the telephone to join the conference call and establish the second communication.

Figure 5:
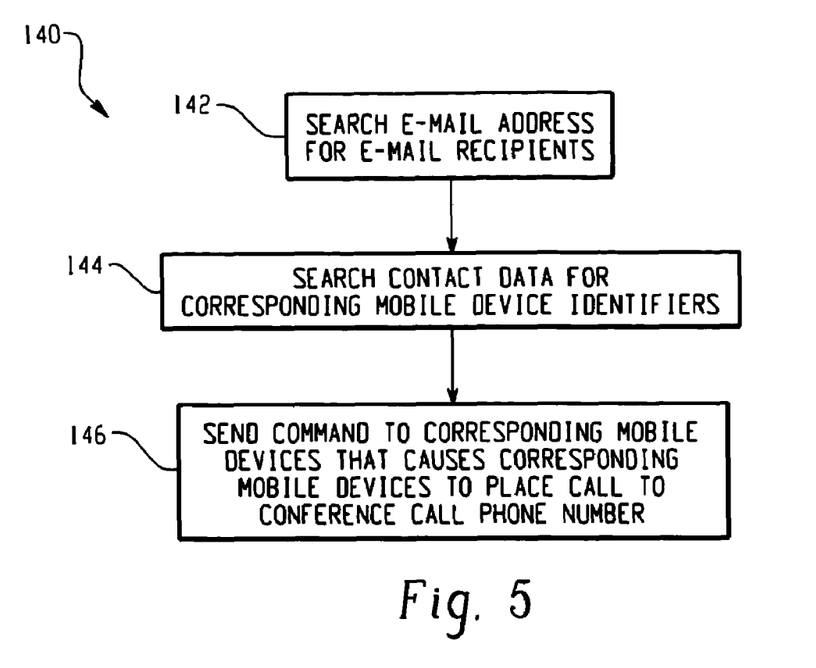
FIG. 5 is a flow diagram for a second process of establishing a second communication.

FIG. 5 is a flow diagram 140 for a second process of establishing a second communication. This embodiment is similar to FIG. 4, except that the communication contact data associated with the second communication medium comprises a conference call telephone number and a mobile device identifier. Step 142 searches an e-mail address field for e-mail recipients to identify the interlocutors. Once the interlocutors are identified, step 144 searches the contact data for mobile device identifiers. Step 146 sends a command to the corresponding mobile devices that cause the mobile devices to place a telephone call to a conference call phone number.

Figure 6:
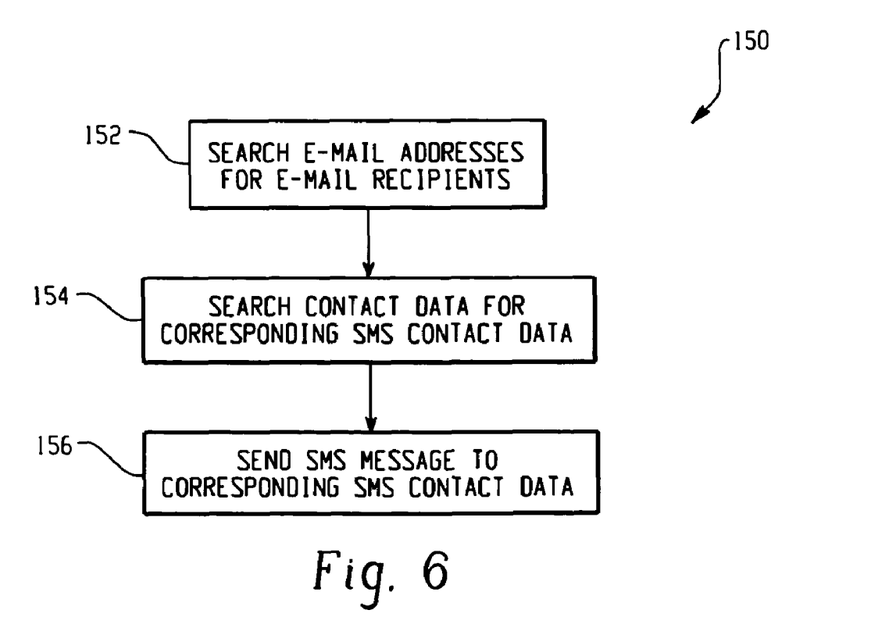
FIG. 6 is a flow diagram for a process of providing communication contact data for a second communication.

FIG. 6 is a flow diagram 150 for a process of providing communication contact data for a second communication. In the embodiment of FIG. 6, a first communication medium comprises an e-mail medium, and a second communication medium comprises an SMS medium. Both the e-mail medium and SMS medium are data communication mediums. The communication contact data comprises e-mail addresses and SMS numbers, respectively. Step 152 searches an e-mail address field for e-mail recipients to identify the interlocutors. Once the interlocutors are identified, step 154 searches the contact data for corresponding interlocutor SMS numbers. An SMS message is then sent to each identified interlocutor in step 156. The SMS message may comprise a communication invitation that includes additional communication contact data, such as "Call 1-216-555-1234 for a conference call at 1:00 EST."

Figure 7:
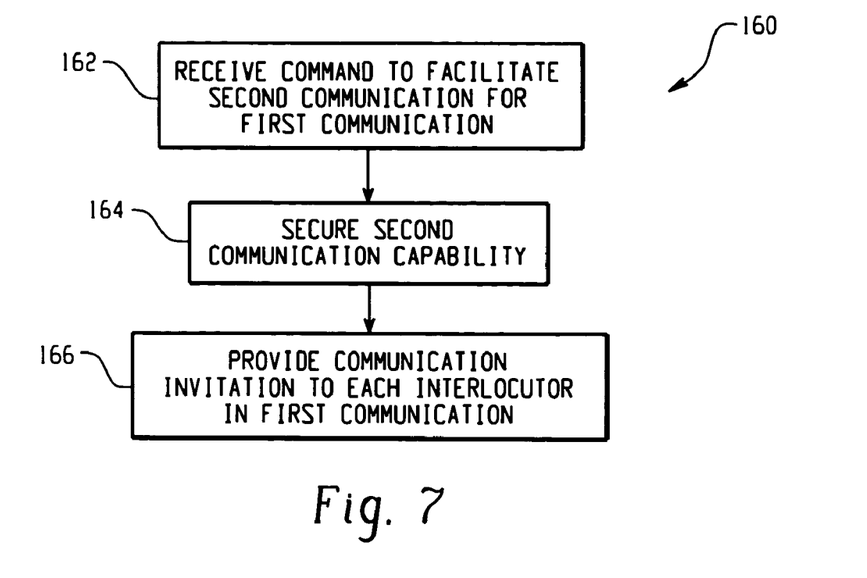
FIG. 7 is a flow diagram for a process of providing a communication invitation.

FIG. 7 is a flow diagram 160 for a process of providing a communication invitation. A communication invitation provides communication contact data that the recipient interlocutor may use to join a second communication. In step 162, a command to facilitate a second communication for a first communication is received. In step 164, a second communication capability is secured. For example, if the second communication to be facilitated is a conference call at a particular time, step 164 may secure a conference call number for a conference call at the particular time. In step 168, a communication invitation is provided to each interlocutor of the first communication. The communication invitation may be provided over the same communication medium as the first communication medium, or over a different communication medium. For example, if the first communication medium is e-mail, the communication invitation may be provided via another e-mail message, an SMS message, or an automated voice mail message.

Figure 8:
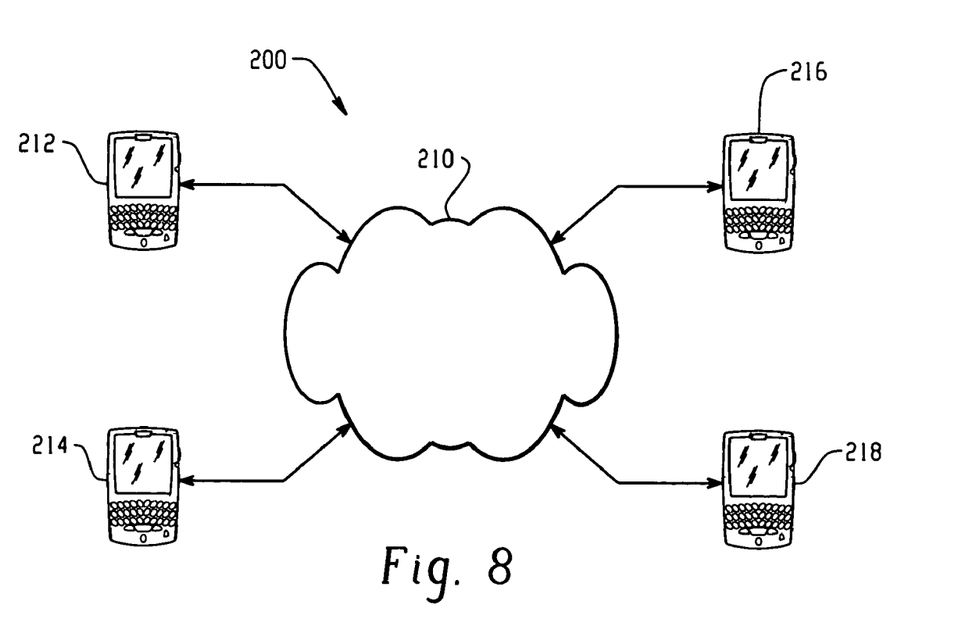
FIG. 8 is a first example operating environment for the systems and methods described herein.

FIG. 8 is a first example operating environment 200 for the systems and methods described herein. A network 210 provides a communication infrastructure for a plurality of mobile communication devices 212, 214, 216 and 218. The network may comprise one or more wired and/or wireless communication networks, such as a WAN in communication with wireless communication networks via a wireless gateway. The mobile devices 212, 214, 216 and 218 include program code operable to send commands to and receive commands from other mobile devices to facilitate a second communication over a second communication medium.

Figure 9:
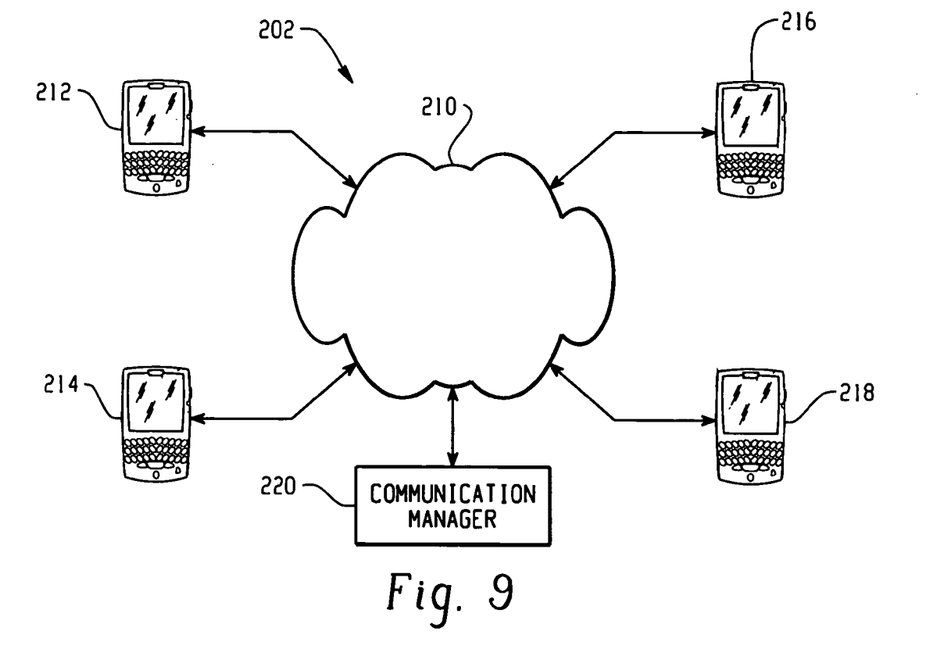
FIG. 9 is a second example operating environment for the systems and methods described herein.

FIG. 9 is a second example operating environment 202 for the systems and methods described herein. A network 210 provides a communication infrastructure for a plurality of mobile communication devices 212, 214, 216 and 218, and a communication manager 220. The communication manager 220 may comprise a computer device that is operable to monitor or manage data transmitted to and from the mobile devices 212, 214, 216 and 218, and facilitate communications among multiple communication mediums as described above.

Figure 10:
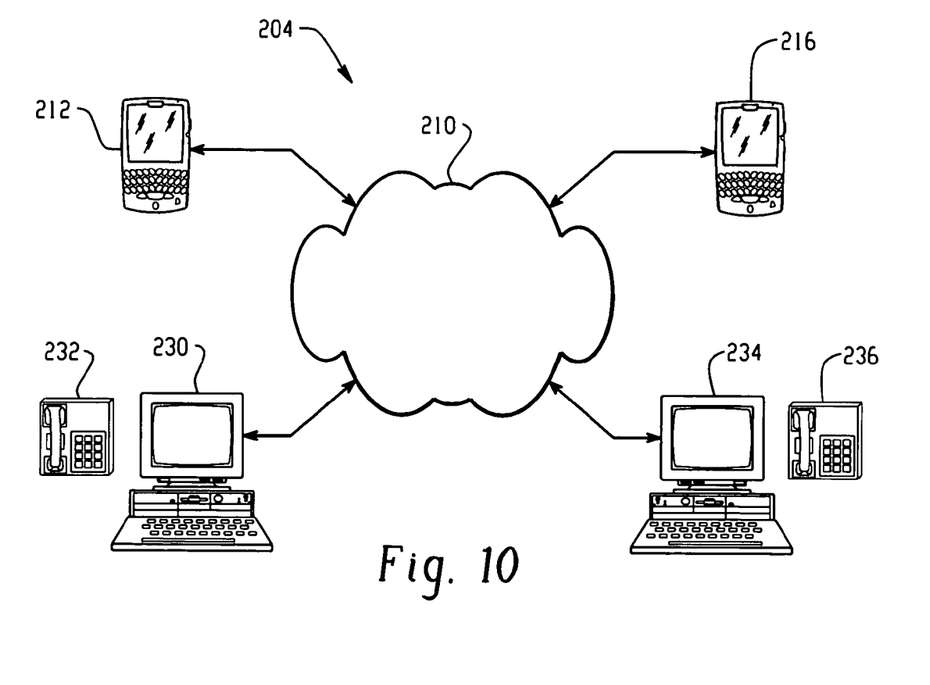
FIG. 10 is a third example operating environment for the systems and methods described herein.

FIG. 10 is a third example operating environment 204 for the systems and methods described herein. A network 210 provides a communication infrastructure for a plurality of mobile communication devices 212 and 216, a plurality of desktop computers 230 and 234, and telephones 232 and 236. The mobile communication devices may have both data and voice communication capabilities. The desktop computers 230 and 234 have data communication capabilities. Interlocutors utilizing the computers 230 and 234 to communicate with interlocutors utilizing the mobile devices 212 and 216 via a data communication may utilize the telephones 232 and 236 to communicate via a voice communication with the interlocutors utilizing the mobile devices 212 and 216. By way of example, the communication contact data corresponding to the computers 230 and 234 may comprise work e-mail addresses, and the communication contact data corresponding to the telephones 232 and 236 may comprise work telephone numbers.

The steps and the order of the steps in the methods and flowcharts described herein may be altered, modified and/or augmented and still achieve the desired outcome. Additionally, the methods, flow diagrams and structure block diagrams described in this patent document may be implemented in the example processing devices described herein by program code comprising program instructions that are executable by the device processing subsystem. Other implementations may also be used, however, such as firmware or even appropriately designed hardware configured to carry out the methods and flow diagrams or implement the structure block diagrams described in this patent document. Additionally, the methods, flow diagrams and structure block diagrams described in this patent document that describe particular methods and/or corresponding acts in support of steps and corresponding functions in support of disclosed software structures may also be implemented in software stored in a computer readable medium, and equivalents thereof. The software structures may comprise source code, object code, machine code, or any other stored data that is operable to cause a processing system to perform methods described herein.

Figure 11:
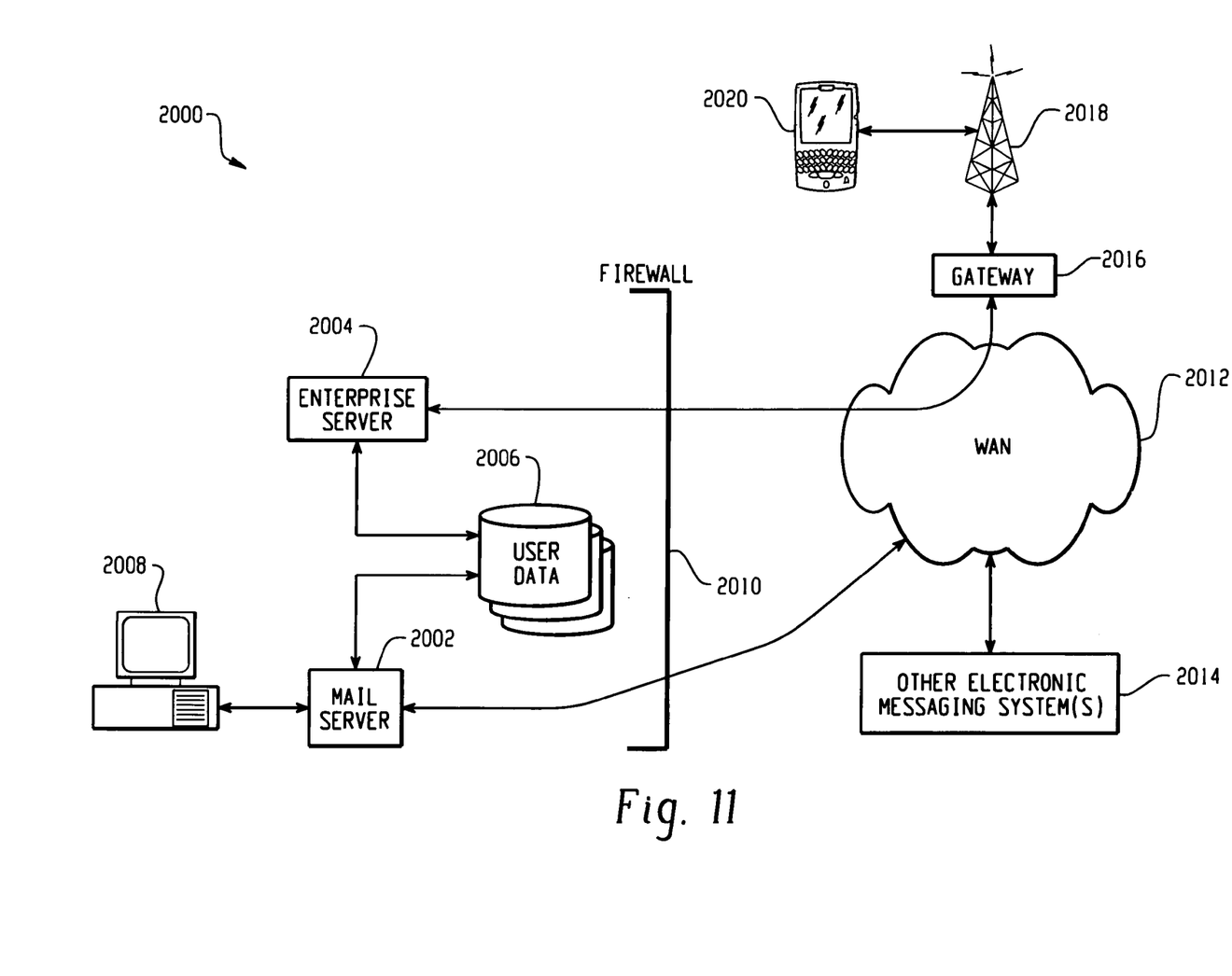
FIG. 11 is a block diagram of an example system for redirecting electronic messages to and from a mobile communication device.

FIG. 11 is a block diagram of an example system 2000 for redirecting electronic messages to and from a mobile communication device 2020. The system 2000 is an example operating environment for the systems and methods described herein. The example redirection system 2000 includes an enterprise server 2004, a mail server 2002, a storage medium 2006 for electronic messaging (e.g., e-mail) account data, and a wireless gateway 2016. Also illustrated are the mobile communication device 2020, a wireless network 2018, a wide area network (WAN) 2012, a firewall 2010, a desktop client 2008, and one or more other electronic messaging systems 2014.

The mail server 2002 may include electronic messaging software executing on a computer within a local area computer network (LAN). The mail server 2002 is coupled to local network devices 2004, 2006, 2008 via the LAN, and is coupled to remote network devices 2014, 2016 via the WAN 2012. The LAN and WAN 2012 may be separated by a firewall 2010.

The mail server 2002 maintains an electronic message account within the electronic message account database 2006 for each desktop client 2008 in the LAN. The electronic message account database 2006 may be one or more storage devices coupled to the mail server 2002, and may be included within the same network device as the mail server 2002 or in one or more separate devices within the LAN. The desktop client 2008 may be one of a plurality of computers (e.g., personal computers, terminals, laptop computers, or other processing devices) coupled to the mail server 2002 via the LAN that execute electronic messaging software to send and receive electronic messages via the mail server.

Electronic messages sent from the desktop client 2008 are stored by the mail server 2002 in an outgoing message storage location (an "outbox") within a corresponding electronic message account 2006. If the outgoing message is addressed to an electronic message account within the LAN, then the mail server 2002 delivers the message to an incoming message storage location (an "inbox") in the appropriate electronic message account 2006. If the outgoing message is addressed to an electronic message account in another electronic messaging system 2014, however, then the message is delivered via the WAN 2012. Similarly, incoming electronic message addressed to the electronic message account 2006 is received by the mail server 2002 and stored to the electronic message account database 2006 within the appropriate incoming message storage location ("inbox"). The incoming electronic message may then be retrieved from the electronic message account 2006 by the desktop client 2008, or may be automatically pushed to the desktop client 2008 by the mail server 2002.

The enterprise server 2004 may include electronic message redirection software executing on a computer within the LAN. The enterprise server 2004 is operational to redirect electronic messages from the electronic message account 2006 to the mobile communication device 2020 and to place messages sent from the mobile communication device 2020 into the electronic message account 2006 for delivery by the mail server 2002. The enterprise server 2004 stores mobile device information, such as a wireless identification number (e.g., a PIN), used to communicate with the mobile communication device 2020. The enterprise server 2004 may, for example, communicate with the mobile communication device 2020 using a direct TCP/IP level connection with the wireless gateway 2016, which provides an interface between the WAN 2012 and the wireless network 2018.

When an electronic message is received in the inbox of the electronic message account 2006, the electronic message is detected by the enterprise server 2004, and a copy of the message and any necessary mobile device information are sent over the WAN 2012 to the wireless gateway 2016. For example, the enterprise server 2004 may encapsulate a copy of the message into one or more data packets along with a wireless identification (e.g., a PIN) for the mobile communication device 2020, and transmit the data packet(s) to the wireless gateway 2016 over a direct TCP/IP level connection. The wireless gateway 2016 may then use the wireless identification and/or other mobile device information to transmit the data packets(s) containing the electronic message over the wireless network 2018 to the mobile communication device 2020.

Electronic messages sent from the mobile communication device 2020 may be encapsulated into one or more data packets along with a network identification for the enterprise server 2004 and then transmitted over the wireless network 2018 to the wireless gateway 2016. The wireless gateway 2016 may use the network identification for the enterprise server 2004 to forward the data packet(s) over the WAN 2012 to the enterprise server 2004, preferably via a direct TCP/IP level connection. Upon receiving the data packet(s) from the wireless gateway 2016, the enterprise server 2004 places the enclosed electronic message into the outbox of the associated electronic message account 2006. The mail server 2002 then detects the electronic message in the outbox and delivers the message, as described above.

Security may be maintained outside of the firewall 2010 by encrypting all electronic messages sent between the enterprise server 2004 and the mobile communication device 2020. For instance, an electronic message to be redirected to the mobile communication device 2020 may be encrypted and compressed by the enterprise server 2004, and the encrypted message may then be encapsulated into one or more data packets for delivery to the mobile communication device 2020. To maintain security, the electronic message may remain encrypted over the entire communication path 2016, 2018, 2012 from the enterprise server 2004 to the mobile communication device 2020. Similarly, electronic messages sent from the mobile communication device 2020 may be encrypted and compressed by the mobile communication device 2020 before being packetized and transmitted to the enterprise server 2004, and may remain encrypted over the entire communication path 2016, 2018, 2012 from the mobile communication device 2020 to the enterprise server 2004.

In addition, the enterprise server 2004 may include a communication subsystem, a memory subsystem and a processing subsystem. The communication subsystem may be operable to communicate with the wireless gateway 2016 over the WAN 2012. The memory subsystem may be operable to store data and program information. The processing subsystem may be operable to store and retrieve data in the memory subsystem and execute programs stored in the memory subsystem, and to cause the communication subsystem to transmit and receive information over the WAN 2012.

The communication manager may, for example, be implemented in the enterprise server 2004, or the gateway 2016, or in one or more mobile devices 2020. Alternatively, communication managers may be distributed throughout the system of FIG. 11.

Figure 12:
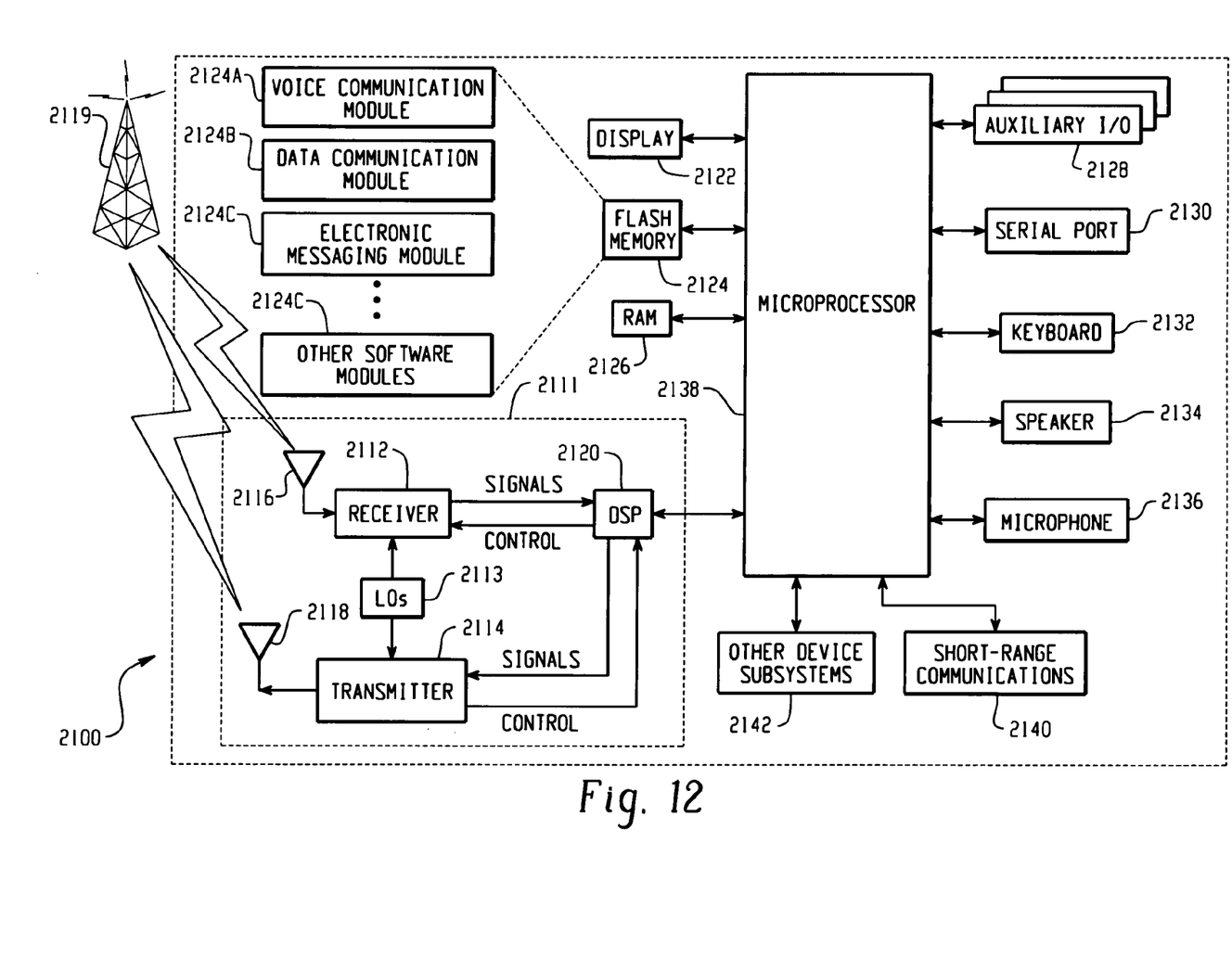
FIG. 12 is a block diagram illustrating an example mobile communication device.

FIG. 12 is a block diagram illustrating an example mobile communication device 2100. The systems and methods described herein may also be implemented in the example mobile device 2100. The mobile device 2100 includes a processing subsystem 2138, a communications subsystem 2111, a short-range communications subsystem 2140, a memory subsystem 2124, 2126, and various other device subsystems and/or software modules 2142. The mobile device 2100 also includes a user interface, which may include a display 2122, a serial port 2130, keyboard 2132, a speaker 2134, a microphone 2136, one or more auxiliary input/output devices 2128, and/or other user interface devices.

The processing subsystem 2138 controls the overall operation of the mobile device 2100. Operating system software executed by the processing subsystem 2138 may be stored in a persistent store, such as a flash memory 2124, but may also be stored in other types of memory devices in the memory subsystem, such as a read only memory (ROM) or similar storage element. In addition, system software, specific device applications, or parts thereof, may be temporarily loaded into a volatile store, such as a random access memory (RAM) 2126. Communication signals received by the mobile device 2100 may also be stored to RAM 2126.

The processing subsystem 2138, in addition to its operating system functions, enables execution of software applications 2124 on the device 2100. A predetermined set of applications that control basic device operations, such as data and voice communications, may be installed on the device 2100 during manufacture. In addition, a personal information manager (PIM) application, including an electronic messaging application, may be installed on the device. The PIM may, for example, be operable to organize and manage data items, such as e-mail, calendar events, voice mails, appointments, and task items. The PIM application may also be operable to send and receive data items via the wireless network 2119.

Communication functions, including data and voice communications, are performed through the communication subsystem 2111, and possibly through the short-range communications subsystem 2140. The communication subsystem 2111 includes a receiver 2112, a transmitter 2114 and one or more antennas 2116, 2118. In addition, the communication subsystem 2111 also includes a processing module, such as a digital signal processor (DSP) 2120 or other processing device(s), and local oscillators (LOs) 2113. The specific design and implementation of the communication subsystem 2111 is dependent upon the communication network in which the mobile device 2100 is intended to operate. For example, a mobile device 2100 may include a communication subsystem 2111 designed to operate within the Mobitex™ mobile communication system, the DataTAC™ mobile communication system, a GSM network, a GPRS network, a UMTS network, and/or an EDGE network.

Network access requirements vary depending upon the type of communication system. For example, in the Mobitex and DataTAC networks, mobile devices are registered on the network using a unique personal identification number or PIN associated with each device. In UMTS and GSM/GPRS networks, however, network access is associated with a subscriber or user of a device. A GPRS device therefore requires a subscriber identity module, commonly referred to as a SIM card, in order to operate on a GSM/GPRS network.

When required network registration or activation procedures have been completed, the mobile device 2100 may send and receive communication signals over the communication network 2119. Signals received by the antenna 2116 from the communication network 2119 are routed to the receiver 2112, which provides signal amplification, frequency down conversion, filtering, channel selection, etc., and may also provide analog to digital conversion. Analog-to-digital conversion of the received signal allows the DSP to perform more complex communication functions, such as demodulation and decoding. In a similar manner, signals to be transmitted to the network 2119 are processed (e.g., modulated and encoded) by the DSP 2120 and are then provided to the transmitter 2114 for digital to analog conversion, frequency up conversion, filtering, amplification and transmission to the communication network 2119 (or networks) via the antenna 2118.

In addition to processing communication signals, the DSP 2120 provides for receiver 2112 and transmitter 2114 control. For example, gains applied to communication signals in the receiver 2112 and transmitter 2114 may be adaptively controlled through automatic gain control algorithms implemented in the DSP 2120.

In a data communication mode, a received signal, such as a text message or web page download, is processed by the communication subsystem 2111 and input to the processing device 2138. The received signal is then further processed by the processing device 2138 for output to a display 2122, or alternatively to some other auxiliary I/O device 2128. A device user may also compose data items, such as e-mail messages, using a keyboard 2138 and/or some other auxiliary I/O device 2128, such as a touchpad, a rocker switch, a thumb-wheel, or some other type of input device. The composed data items may then be transmitted over the communication network 2119 via the communication subsystem 2111.

In a voice communication mode, overall operation of the device is substantially similar to the data communication mode, except that received signals are output to a speaker 2134, and signals for transmission are generated by a microphone 2136. Alternative voice or audio I/O subsystems, such as a voice message recording subsystem, may also be implemented on the device 2100. In addition, the display 2122 may also be utilized in voice communication mode, for example, to display the identity of a calling party, the duration of a voice call, or other voice call related information.

The short-range communications subsystem 2140 enables communication between the mobile device 2100 and other proximate systems or devices, which need not necessarily be similar devices. For example, the short-range communications subsystem 2140 may include an infrared device and associated circuits and components, or a Bluetooth™ communication module to provide for communication with similarly-enabled systems and devices.

The embodiments described herein are examples of structures, systems or methods having elements corresponding to the elements of the invention recited in the claims. This written description may enable those of ordinary skill in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims.

What is claimed is:

1. A processor-implemented method for facilitating communication over a plurality of communication mediums for a plurality of interlocutors, wherein the plurality of interlocutors communicate in a first communication over a first communication medium, comprising:
   receiving an indication at a mobile device to facilitate a second communication over a second communication medium for the first communication over the first communication medium;
   identifying, at the mobile device, interlocutors in the first communication over the first communicating medium in response to the indication;
   accessing contact data on the mobile device that includes communication contact data corresponding to the plurality of communication mediums and the plurality of interlocutors;
   determining, based on the contact data on the mobile device, whether the interlocutors identified have an associated communication capability over the second communication medium;
   establishing at the mobile device the second communication between the interlocutors determined to have the associated communication capability over the second communication medium; and
   sending a communication exclusion notification from the mobile device during the first communication to an interlocutor at a second mobile device determined not to have the associated communication capability over the second communication medium, the communication exclusion notification including communication contact data for the second communication medium that enables the interlocutor determined not to have the associated communication capability to establish a communication with the mobile device over the second communication medium.

2. The method of claim 1, wherein the first communication medium is an e-mail medium, and wherein identifying the interlocutors in the first communication over the first communicating medium comprises identifying addressed e-mail addresses.

3. The method of claim 2, wherein determining, based on the contact data, whether the interlocutors identified have an associated communication capability over the second communication medium comprises:
   searching communication contact data associated with each of the addressed e-mail addresses; and
   determining if the contact data associated with each of the addressed e-mail addresses includes communication contact data for the second communication medium.

4. The method of claim 3, wherein the second communication medium comprises a telecommunication medium, and the communication contact data comprises a telephone number.

5. The method of claim 4, wherein the communication exclusion notification comprises the telephone number.

6. The method of claim 1, wherein the communication exclusion notification comprises communication contact data for the communication medium.

7. The method of claim 1, wherein sending a communication exclusion notification to an interlocutor determined not to have the associated communication capability over the second communication medium comprises sending the communication exclusion notification to the interlocutor over the first communication medium.

8. The method of claim 1, wherein receiving an indication to facilitate a second communication over a second communication medium for a first communication over a first communication medium comprises receiving a second communication medium selection from one of the interlocutors.

9. The method of claim 1, wherein:
   the first communication medium comprises an e-mail medium;
   the second communication medium comprises a telephonic medium;
   the communication contact data associated with the first communication medium comprises an e-mail address; and
   the communication contact data associated with the second communication medium comprises a telephone number.

10. The method of claim 9, wherein the telephone number corresponds to a conference call number, and wherein establishing the second communication between the interlocutors determined to have the associated communication capability over the second communication medium comprises automatically placing a call to the conference call number for each of the interlocutors determined to have the associated communication capability over the second communication medium.

11. The method of claim 10, further comprising sending a communication exclusion notification over the first communication medium to an interlocutor determined not to have the associated communication capability over the second communication medium, the communication exclusion notification including the conference call number.

12. The method of claim 9, wherein the telephone number corresponds to a interlocutor phone number, and wherein establishing the second communication between the interlocutors determined to have the associated communication capability over the second communication medium comprises automatically placing a call to the interlocutor phone number for each of the interlocutors determined to have the associated communication capability over the second communication medium.

13. The method of claim 1, wherein:
the first communication medium comprises a telephonic medium;
the second communication medium comprises an e-mail medium;
the communication contact data associated with the first communication medium comprises telephone numbers; and
the communication contact data associated with the second communication medium comprises e-mail addresses.

14. The method of claim 1, wherein the first communication medium comprises a data communication network, and the second communication medium comprises a voice communication network.

15. The method of claim 1, wherein the first and second communication mediums comprise data communication networks, and wherein the communication contact data associated with the first communication medium comprises an e-mail address and the communication contact data associated with the second communication medium comprises an PIN associated with a mobile communication device.

16. A system for facilitating communication over a plurality of communication mediums for a plurality of interlocutors, comprising:
means for receiving at a mobile device an indication to facilitate a second communication over a second communication medium for the first communication over the first communication medium;
means for identifying, at the mobile device, interlocutors in the first communication over the first communicating medium in response to the indication;
means for accessing contact data on the mobile device that includes communication contact data corresponding to the plurality of communication mediums and the plurality of interlocutors;
means for determining, based on the contact data on the mobile device, whether the interlocutors identified have an associated communication capability over the second communication medium;
means for establishing at the mobile device the second communication between the interlocutors determined to have the associated communication capability over the second communication medium; and
means for sending a communication exclusion notification from the mobile device during the first communication to an interlocutor at a second mobile device determined not to have the associated communication capability over the second communication medium, the communication exclusion notification including communication contact data for the second communication medium that enables the interlocutor determined not to have the associated communication capability to establish a communication with the mobile device over the second communication medium.

17. The system of claim 16, wherein the first communication medium comprises a data communication medium, and the second communication medium comprises a voice communication medium.

18. A system for switching communication mediums for a plurality of interlocutors in a communication exchange, comprising:
a mobile communication device comprising a processing subsystem, a memory subsystem, a display subsystem, a communication subsystem, and an input/output subsystem, the processing subsystem coupled to the memory subsystem, display subsystem, input/output subsystem and communication subsystem, and operable to store and retrieve data in the memory subsystem, to execute instructions stored in the memory subsystem, receive input data from the input/output subsystem, and to cause the communication subsystem to transmit and receive communication data over a plurality of communication mediums; and
mobile device program code comprising program instructions executable by the processing subsystem and stored in the memory subsystem and upon execution cause the mobile device to be operable to:
receive an indication to switch a first communication over a first communication medium from the first communication medium to a second communication medium;
identify interlocutors in the first communication over the first communicating medium in response to the indication;
access contact data comprising communication contact data corresponding to a plurality of communication mediums and a plurality of interlocutors to determine whether the interlocutors identified have an associated communication capability over the second communication medium; and
establish the second communication between the interlocutors determined to have the associated communication capability over the second communication medium;
wherein the mobile device program code comprises further instructions that upon execution causes the mobile device to be operable to issue a communication exclusion notification from the mobile device during the first communication to an interlocutor at a second mobile device determined not to have the associated communication capability over the second communication medium, the communication exclusion notification including communication contact data for the second communication medium that enables the interlocutor determined not to have the associated communication capability to establish a communication with the mobile device over the second communication medium.

19. The system of claim 18, wherein the first communication medium is an e-mail medium, and wherein the communication exclusion notification comprises an e-mail message.

20. The system of claim 18, wherein the second communication medium comprises a telephonic medium and the second communication comprises a conference call.

21. The system of claim 20, wherein the communication exclusion notification comprises a telephone number for the conference call.

22. The system of claim 21, wherein the first communication medium is an e-mail medium, and wherein the communication exclusion notification comprises an e-mail message.

23. The system of claim 18, wherein:
the first communication medium comprises an e-mail medium;
the second communication medium comprises a telephonic medium;
the communication contact data associated with the first communication medium comprises an e-mail address; and
the communication contact data associated with the second communication medium comprises a telephone number.

24. The system of claim 23, wherein the telephone number corresponds to a conference call number, and wherein the program code comprise further instructions that upon execution causes the mobile device to establish the second communication between the interlocutors determined to have the associated communication capability over the second communication medium comprises program code that upon execution causes the mobile device to automatically place a call to the conference call number for each of the interlocutors determined to have the associated communication capability over the second communication medium.

25. The system of claim 24, wherein the program code comprises further instructions that upon execution cause the mobile device to send a communication exclusion e-mail notification over the first communication medium to an interlocutor determined not to have the associated communication capability over the second communication medium, the communication exclusion e-mail notification including the conference call number.

26. The system of claim 23, wherein the telephone number corresponds to a conference call number, and wherein the program code comprise further instructions that upon execution causes the mobile device to establish the second communication between the interlocutors determined to have the associated communication capability over the second communication medium comprises program code that upon execution causes the mobile device to automatically place a call to the interlocutor phone number for each of the interlocutors determined to have the associated communication capability over the second communication medium.

27. The system of claim 18, wherein the contact data comprises an address book data store stored in the memory subsystem.

28. The system of claim 18, wherein the first communication medium comprises a data communication network, and the second communication medium comprises a voice communication network.

29. A system for facilitating communication over communication mediums for a plurality of interlocutors in a communication exchange, comprising:
    a communication monitor comprising a processing subsystem, a memory subsystem, a display subsystem, a communication subsystem, the processing subsystem coupled to the memory subsystem and communication subsystem, and operable to store and retrieve data in the memory subsystem, to execute instructions stored in the memory subsystem, and to cause the communication subsystem to monitor communications over a over a plurality of communication mediums; and
    communication monitor program code comprising program instructions executable by the processing subsystem and stored in the memory subsystem and upon execution cause the communication monitor to be operable to:
    receive an indication to facilitate a second communication over a second communication medium for a first communication over a first communication medium;
    identify interlocutors in the first communication over the first communicating medium in response to the indication;
    access contact data comprising communication contact data corresponding to a plurality of communication mediums and a plurality of interlocutors to determine whether the interlocutors identified have an associated communication capability over the second communication medium;
    establish the second communication between the interlocutors determined to have the associated communication capability over the second communication medium; and
    issue a communication exclusion notification from the mobile device during the first communication to an interlocutor at a second mobile device determined not to have the associated communication capability over the second communication medium the communication exclusion notification including communication contact data for the second communication medium that enables the interlocutor determined not to have the associated communication capability to establish a communication with the mobile device over the second communication medium.

30. The system of claim 29, wherein the first communication medium is an e-mail medium, and wherein the communication exclusion notification comprises an e-mail message.

31. The system of claim 30, wherein the communication monitor is operable to monitor communications over a plurality of mobile communication devices.

32. The system of claim 29, wherein the second communication medium comprises a telephonic medium and the second communication comprises a conference call.

33. The system of claim 32, wherein the program code comprises further instructions that upon execution cause the communication monitor to issue a communication exclusion notification to an interlocutor determined not to have the associated communication capability over the second communication medium.

34. The system of claim 33, wherein the first communication medium is an e-mail medium, and wherein the communication exclusion notification comprises an e-mail message.

35. The system of claim 34, wherein the communication exclusion notification includes a telephone number for accessing the conference call.

36. The system of claim 29, wherein the first communication medium comprises a data communication network, and the second communication medium comprises a voice communication network.

37. The system of claim 29, wherein the communication monitor program code comprises further instructions that upon execution cause the communication monitor to store the contact data comprising communication contact data corresponding to a plurality of communication mediums and a plurality of interlocutors.

38. A processor-implemented method for facilitating communication via a plurality of communication modes for a plurality of communication users, comprising:
    receiving an indication at a mobile device to accommodate a first communication over a first communication mode by a second communication over a second communication mode;
    identifying, at the mobile device, communication users in the first communication over the first communication mode in response to the indication;
    accessing contact data on the mobile device comprising communication contact data corresponding to a plurality of communication modes and a plurality of communication users to determine whether the communication users identified have an associated communication capability over the second communication mode; and
    establishing at the mobile device the second communication between the communication users determined to have the associated communication capability over the second communication mode; and
    sending a communication mode notification from the mobile device during the first communication to a communication user at a second mobile device determined not to have the associated communication capability over the second communication mode, the communication mode notification including communication contact data for the second communication mode that enables the interlocutor determined not to have the associated communication capability to establish a communication with the mobile device over the second communication mode.

39. The method of claim 38, wherein the first communication mode comprises an e-mail communication, and wherein identifying the communication users in the first communication comprises identifying addressed e-mail addresses.

40. The method of claim 39, wherein the second communication mode comprises a telecommunication communication, and the communication contact data comprises a telephone number.

41. The method of claim 39, wherein receiving an indication to accommodate a first communication over a first communication mode by a second communication over a second communication mode comprises receiving a second communication mode selection from one of the communication users.

42. The method of claim 38, wherein the first communication mode comprises a data communication mode, and the second communication mode comprises a voice communication mode.

43. The method of claim 38, wherein the first and second communication modes comprise data communication modes.

44. A system for facilitating communication via a plurality of communication modes for a plurality of communication users, comprising:
    means for receiving an indication at a mobile device to accommodate a first communication over a first communication mode by a second communication over a second communication mode;
    means for identifying, at the mobile device, communication users in the first communication over the first communication mode in response to the indication;
    means for accessing contact data on the mobile device comprising communication contact data corresponding to a plurality of communication modes and a plurality of communication users to determine whether the communication users identified have an associated communication capability over the second communication mode; and
    means for establishing an the mobile device the second communication between the communication users determined to have the associated communication capability over the second communication mode; and
    means for sending a communication mode notification from the mobile device during the first communication to a communication user at a second mobile device determined not to have the associated communication capability over the second communication mode, the communication mode notification including communication contact data for the second communication mode that enables the interlocutor determined not to have the associated communication capability to establish a communication with the mobile device over the second communication mode.

45. A processor-implemented method for facilitating communication over a plurality of communication mediums for a plurality of interlocutors, comprising:
    receiving at a mobile device an indication to facilitate a second communication over a second communication medium corresponding to a first communication over a first communication medium;
    identifying, at the mobile device, interlocutors in the first communication over the first communicating medium in response to the indication;
    determining at the mobile device for each interlocutor whether each interlocutor has a communication capability over the second communication medium;
    sending a communication exclusion notification over the first communication medium from the mobile device during the first communication to each interlocutor at a second mobile device determined not to have the associated communication capability over the second communication medium, the communication exclusion notification including communication contact data for the second communication medium that enables the interlocutor determined not to have the associated communication capability to establish a communication with the mobile device over the second communication medium; and
    sending from the mobile device a communication invitation notification over the first communication medium to each interlocutor identified in the first communication medium.

46. The method of claim 45, wherein the communication invitation comprises contact data for the second communication.

47. The method of claim 46, wherein the first communication medium is an e-mail communication, and the second communication medium is a telephone communication.

48. The method of claim 47, wherein the contact data of the communication invitation comprises a conference call telephone number.

49. The method of claim 3, wherein the first communication is a telephonic communication and the second communication is an e-mail communication.

50. The method of claim 3, wherein the first communication is an e-mail communication and the second communication is a telephonic communication.

* * * * *

UNITED STATES PATENT AND TRADEMARK OFFICE
CERTIFICATE OF CORRECTION

PATENT NO. : 7,609,659 B2
APPLICATION NO. : 10/913879
DATED : October 27, 2009
INVENTOR(S) : Hassan et al.

It is certified that error appears in the above-identified patent and that said Letters Patent is hereby corrected as shown below:

Column 12, line 60, please replace "corresponds to a interlocutor" with -- corresponds to an interlocutor --
Column 13, lines 20-21, please replace "comprises an PIN" with -- comprises a PIN --
Column 14, line 63, please replace "program code comprise" with -- program code comprises --
Column 15, line 15, please replace "program code comprise" with -- program code comprises --
Column 15, line 41, please replace "over a over a" with -- over a --
Column 16, line 1, please replace "medium the" with -- medium, the --
Column 17, line 41, please replace "establishing an the mobile" with -- establishing the mobile --
Column 18, line 44, please replace "of claim 3" with -- of claim 2 --
Column 18, line 47, please replace "of claim 3" with -- of claim 2 --

Signed and Sealed this

Eleventh Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,609,659 B2  Page 1 of 1
APPLICATION NO. : 10/913879
DATED : October 27, 2009
INVENTOR(S) : Ahmed E. Hassan et al.

It is certified that error appears in the above-identified patent and that said Letters Patent is hereby corrected as shown below:

Title page, item (*) Notice: should read as follows:

Subject to any disclaimer, the term of this patent is extended or adjusted under 35 U.S.C. 154(b) by 1482 days.

Signed and Sealed this

Twenty-second Day of June, 2010

David J. Kappos
*Director of the United States Patent and Trademark Office*